(12) United States Patent
Choi et al.

(10) Patent No.: US 9,312,523 B2
(45) Date of Patent: Apr. 12, 2016

(54) NON-STOP BATTERY EXCHANGING SYSTEM

(71) Applicant: DAEGU GYEONGBUK INSTITUTE OF SCIENCE & TECHNOLOGY, Daegu (KR)

(72) Inventors: Youn-ho Choi, Daegu (KR); Dong-ha Lee, Daegu (KR)

(73) Assignee: DAEGU GYEONGBUK INSTITUTE OF SCIENCE & TECHNOLOGY, Daegu (KR)

( * ) Notice: Subject to any disclaimer, the term of this patent is extended or adjusted under 35 U.S.C. 154(b) by 166 days.

(21) Appl. No.: 14/051,479

(22) Filed: Oct. 11, 2013

(65) Prior Publication Data

US 2014/0130344 A1    May 15, 2014

(30) Foreign Application Priority Data

Nov. 12, 2012    (KR) .................. 10-2012-0127415

(51) Int. Cl.
| | | |
|---|---|---|
| *B23P 19/00* | (2006.01) | |
| *H05K 13/04* | (2006.01) | |
| *H01M 2/10* | (2006.01) | |
| *B60L 11/18* | (2006.01) | |

(52) U.S. Cl.
CPC .......... *H01M 2/1016* (2013.01); *B60L 11/1822* (2013.01); *Y02T 10/7005* (2013.01); *Y02T 10/7072* (2013.01); *Y02T 90/124* (2013.01); *Y02T 90/14* (2013.01); *Y10T 29/5313* (2015.01)

(58) Field of Classification Search
CPC .................................................. Y10T 29/5313
USPC .......... 29/729, 718, 721, 739, 742, 754, 760, 29/763
See application file for complete search history.

(56) References Cited

U.S. PATENT DOCUMENTS

| | | | | |
|---|---|---|---|---|
| 6,492,058 B1* | 12/2002 | Watanabe et al. | ............. | 429/121 |
| 6,529,714 B1* | 3/2003 | Nakamura et al. | ......... | 455/575.1 |
| 7,404,733 B2* | 7/2008 | Jeon | ............... | 439/500 |
| 8,016,610 B1* | 9/2011 | Lee et al. | ...................... | 439/500 |
| 2005/0197170 A1* | 9/2005 | Jeon | ............... | 455/572 |
| 2014/0068314 A1* | 3/2014 | Kim et al. | ...................... | 713/340 |

FOREIGN PATENT DOCUMENTS

| | | | |
|---|---|---|---|
| JP | 07-248854 A | | 9/1995 |
| KR | 1020040092224 | * | 3/2004 |
| KR | 10-2004-0092224 A | | 11/2004 |
| KR | 10-2005-0019544 A | | 3/2005 |

* cited by examiner

*Primary Examiner* — Paul D Kim (74) *Attorney, Agent, or Firm* — Paratus Law Group, PLLC (57) ABSTRACT

Provided is a non-stop battery exchanging system including a battery to which a locking protrusion that can enter or exit is coupled, a main body having a receiving groove in which the battery is received and a locking groove recessed in the receiving groove to allow insertion of the locking protrusion and fix the battery, and configured to move in a state in which the battery is mounted, a battery separating unit disposed in a moving direction of the main body and configured to separate the battery from the main body, a battery mounting unit configured to mount a charged battery on the main body, from which the battery is separated, from the battery separating unit, and a power supply unit configured to compensate a voltage difference generated during separation of the battery and mounting of the charged battery, and supply power to the main body.

6 Claims, 8 Drawing Sheets

NON-STOP BATTERY EXCHANGING SYSTEM

CROSS REFERENCE TO PRIOR APPLICATIONS

The present application claims priority under 35 U.S.C. §119 to Korean Patent Application No. 10-2012-0127415 (filed on Nov. 12, 2012), which is hereby incorporated by reference in its entirety.

BACKGROUND OF THE INVENTION

1. Field of the Invention

The present invention relates to a battery exchanging apparatus, and more particularly, to a non-stop battery exchanging system capable of exchanging a battery in a state in which an apparatus on which the battery is mounted is not stopped.

2. Description of Related Art

In general, an apparatus using a battery as an energy supply source, for example, an electric vehicle, a mobile phone, or the like, is used by exchanging the battery with a new one or charging the battery by connecting another power source to a main body when all energy is used from the battery. Here, a battery exchanging method includes stopping a system in operation such as an electric vehicle, a robot, or the like, separating the used battery, and mounting a charged battery.

However, in the battery exchanging method, since the system in operation should be stopped to separate the battery, a power source of the system should be cut to stop an operation of the apparatus for that time.

SUMMARY OF THE INVENTION

Accordingly, the present invention is directed to provide a non-stop battery exchanging system capable of exchanging a used battery with a charged battery in a state in which an apparatus using the battery is not stopped but operated, maintaining a system in operation, and securing continuity of the operation of the system.

The present invention provides a non-stop battery exchanging system including: a battery to which a locking protrusion that can enter or exit is coupled; a main body having a receiving groove in which the battery is received and a locking groove recessed in the receiving groove to allow insertion of the locking protrusion and fix the battery, and configured to move in a state in which the battery is mounted; a battery separating unit disposed in a moving direction of the main body and configured to separate the battery from the main body; a battery mounting unit configured to mount a charged battery on the main body, from which the battery is separated, from the battery separating unit; and a power supply unit configured to compensate for a voltage difference generated during separation of the battery and mounting of the charged battery, and supply power to the main body.

The battery separating unit may include an insertion protrusion mounted on a moving path of the main body and configured to separate the locking protrusion from the locking groove.

Each of the locking groove and the locking protrusion may be provided as a pair, and each of the locking grooves and the locking protrusion may be disposed perpendicular to a progress direction of the main body.

The battery may further include a pair of triggers configured to come in contact with the insertion protrusion to be spaced apart from each other such that the pair of locking protrusions are separated from the pair of locking grooves; and a pair of springs mounted on the pair of triggers to bring the triggers in close contact with each other when not come in contact with the insertion protrusion.

The battery may further include a pair of rack/pinion gears coupled between the triggers and the locking protrusions, facing each other, such that the triggers and the locking protrusions are moved in different directions.

The main body may further include a guide inclined and recessed along an edge of the receiving groove to guide movement of the locking protrusions to the receiving groove.

The battery mounting unit may include a first stopper configured to insert the locking protrusions from the charged battery moved along the guide to mount the charged battery on the main body from which the battery is separated; and a second stopper raised to bring the charged battery in close contact with the main body after the locking protrusions are inserted into the locking grooves of the main body.

The power supply unit may include a positive power source rail connected to a positive electrode of the main body between the battery separating unit and the battery mounting unit; and a negative power source rail connected to negative electrodes of the batteries between the used battery and the charged battery.

DETAILED DESCRIPTION OF THE INVENTION

Hereinafter, an exemplary embodiment of the present invention will be described in detail with reference to the accompanying drawings. First, in designation of reference numerals to components of the drawings, the same components are designated by the same reference numerals even when the components are shown in different drawings. In addition, in description of the present invention, when it is determined that specific description of known components or functions may blur the spirit of the present invention, detailed description thereof will be omitted.

A non-stop battery exchanging system of the present invention may be applied to all apparatuses using a battery as a power source, for example, an electric vehicle, a ground robot, an air robot, or the like, in which exchange of a battery is needed without stopping an operation thereof. In the embodiment, for the convenience of description, a robot will be described as an example of the apparatus.

Figure 1:
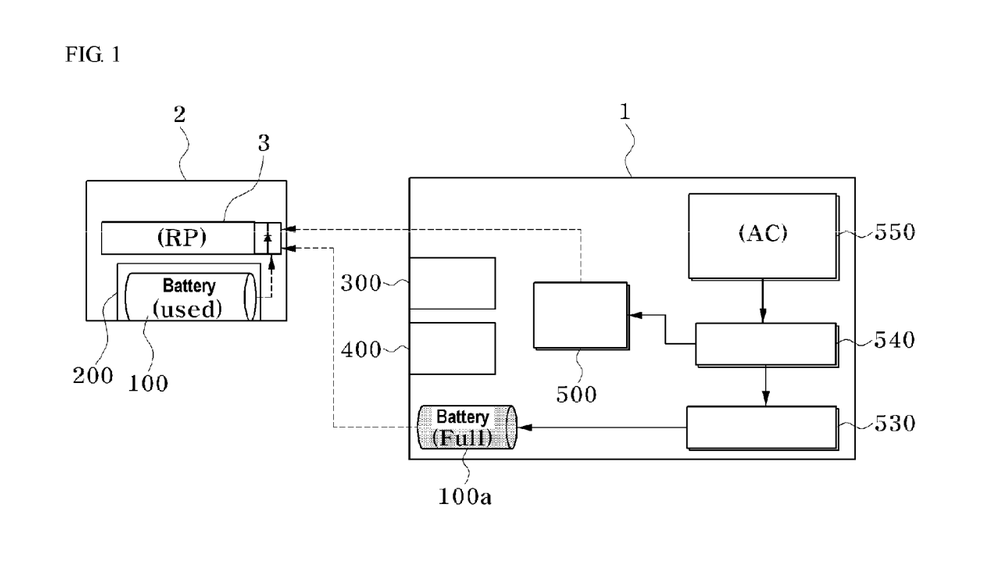
FIG. 1 is a configuration view of a non-stop battery exchanging system according to an embodiment of the present invention.
Figure 2:
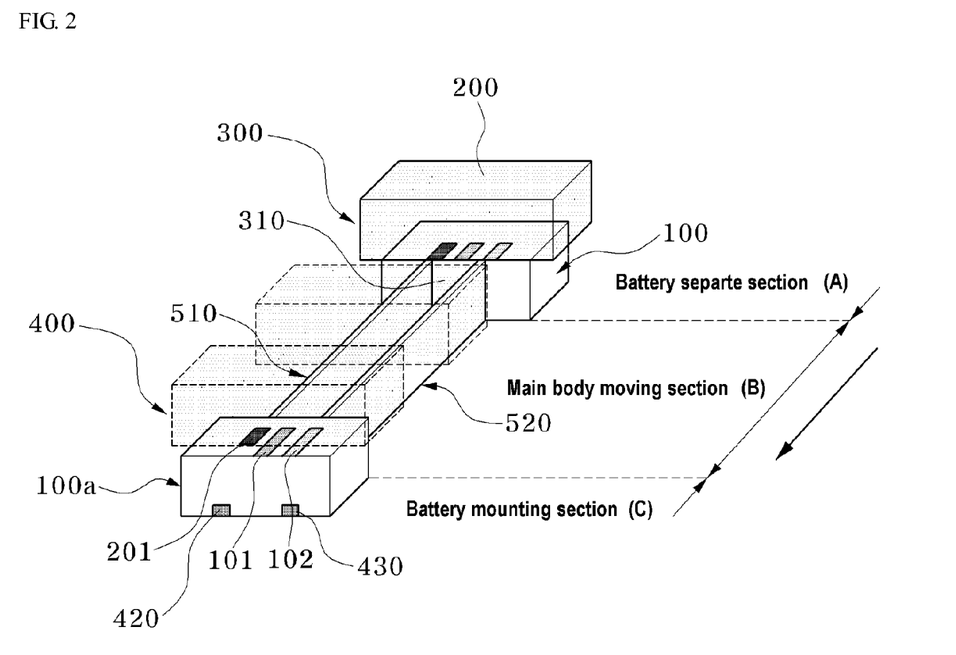
FIG. 2 is a perspective view schematically showing a battery separating section and a battery mounting section.

FIG. 1 is a configuration view of a non-stop battery exchanging system according to an embodiment of the present invention, and FIG. 2 is a perspective view schematically showing a battery separating section and a battery mounting section.

As shown in FIG. 1, a non-stop battery exchanging system 1 according to the embodiment of the present invention may be constituted by a series of devices mounted on a robot 2 and configured to exchange a used battery 100 with a full-charged battery 100a.

A power source management unit 3 (robot power (RP)) configured to receive power from the battery 100 is installed in the robot 2, and various operations of the robot 2 are performed by the power supplied from the power source management unit 3.

The battery 100 is detachably attached to a main body 200. For example, the battery 100 may be detachably disposed at a lower portion of the main body 200. The battery 100 is easily separated from the main body 200 by a battery separating unit 300, and the new battery 100a charged by a battery mounting unit 400 is mounted in a space from which the battery 100 is separated.

As shown in FIG. 2, the non-stop battery exchanging system 1 of the embodiment may have a battery separating section A in which the main body 200 on which the battery 100 is mounted is moved in a certain direction and the battery 100 is separated by the battery separating unit 300, a main body moving section B in which only the main body 200 from which the battery 100 is separated is moved, and a battery mounting section C in which the charged battery 100a is mounted.

Here, a power supply unit 500 compensates for a voltage difference between the batteries 100 and 100a generated during separation of the used battery 100 and mounting of the charged battery 100a, i.e., during the battery separating/mounting sections A and C, and stably supplies power to the power source management unit 3 to the robot 2. Accordingly, during exchange of the battery, the system of the robot 2 can be continuously operated without stoppage.

More specifically, the power supply unit 500 may include a positive power source rail 510 connected to a positive electrode 201 of the main body 200 between the battery separating unit 300 and the battery mounting unit 400, and a negative power source rail 520 connected to negative electrodes 102 of the batteries 100 and 100a between the used battery 100 and the charged battery 100a.

Accordingly, as the robot 2 is electrically connected even while the battery is moved along the main body moving section B, the power supply unit 500 can supply electricity generated from a power source 550 in the non-stop battery exchanging system 1 to the robot 2 through a power management apparatus 540, and the power management apparatus 540 can supply the power to a charging apparatus 530 to charge the battery 100a, which is to be exchanged.

Figure 3:
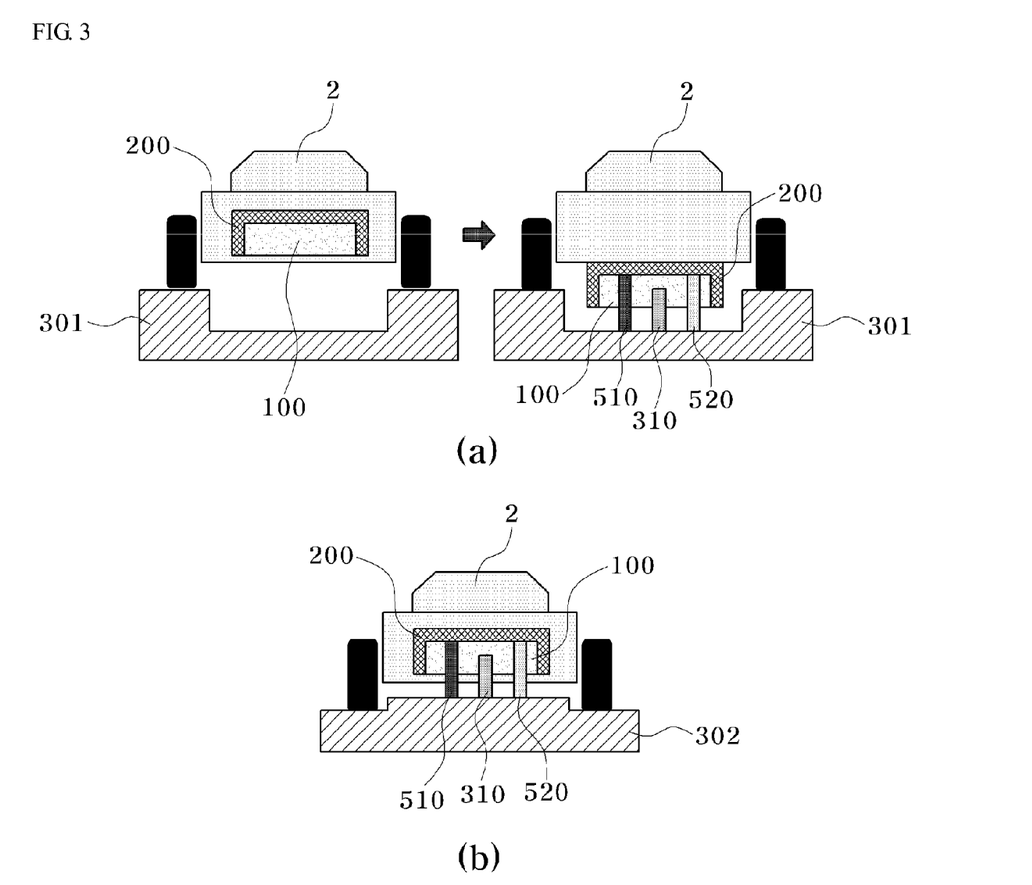
FIG. 3 is a view showing examples of a main body on which a battery of FIG. 2 is mounted.

Meanwhile, FIG. 3 shows embodiments of the main body on which the battery of FIG. 2 is mounted. As shown in FIG. 3(a), when the main body 200 on which the battery 100 is separated by the battery separating unit 300, a slide-down type in which both of the battery 100 and the main body 200 are moved downward may be considered.

For this, the battery separating unit 300 may include a battery exchanging dock 301 having a recessed center region. An insertion protrusion 310 may be fixedly installed at a center region of the battery exchanging dock 301, and the positive power source rail 510 and the negative power source rail 520 may be installed at left and right sides of the insertion protrusion 310. In addition, moving paths having a plate shape, a rail shape, or the like, may be formed at both sides of a battery exchanging dock 302 such that wheels of the robot 2 can move.

Further, when the battery 100 is separated as shown in FIG. 3(b), a direct mounting type in which an installation position of the battery 100 and the main body 200 is not varied may be provided. Here, the battery separating unit 300 may include the battery exchanging dock 302 having a convex center region.

Similarly, the insertion protrusion 310 (to be described below) may be fixedly installed at a center region of the battery exchanging dock 302, and the positive power source rail 510 and the negative power source rail 520 may be installed at left and right sides of the insertion protrusion 310. In addition, moving paths having a plate shape, a rail shape, or the like, may be formed at both sides of a battery exchanging dock 302 such that the wheels of the robot 2 can move.

Figure 4:
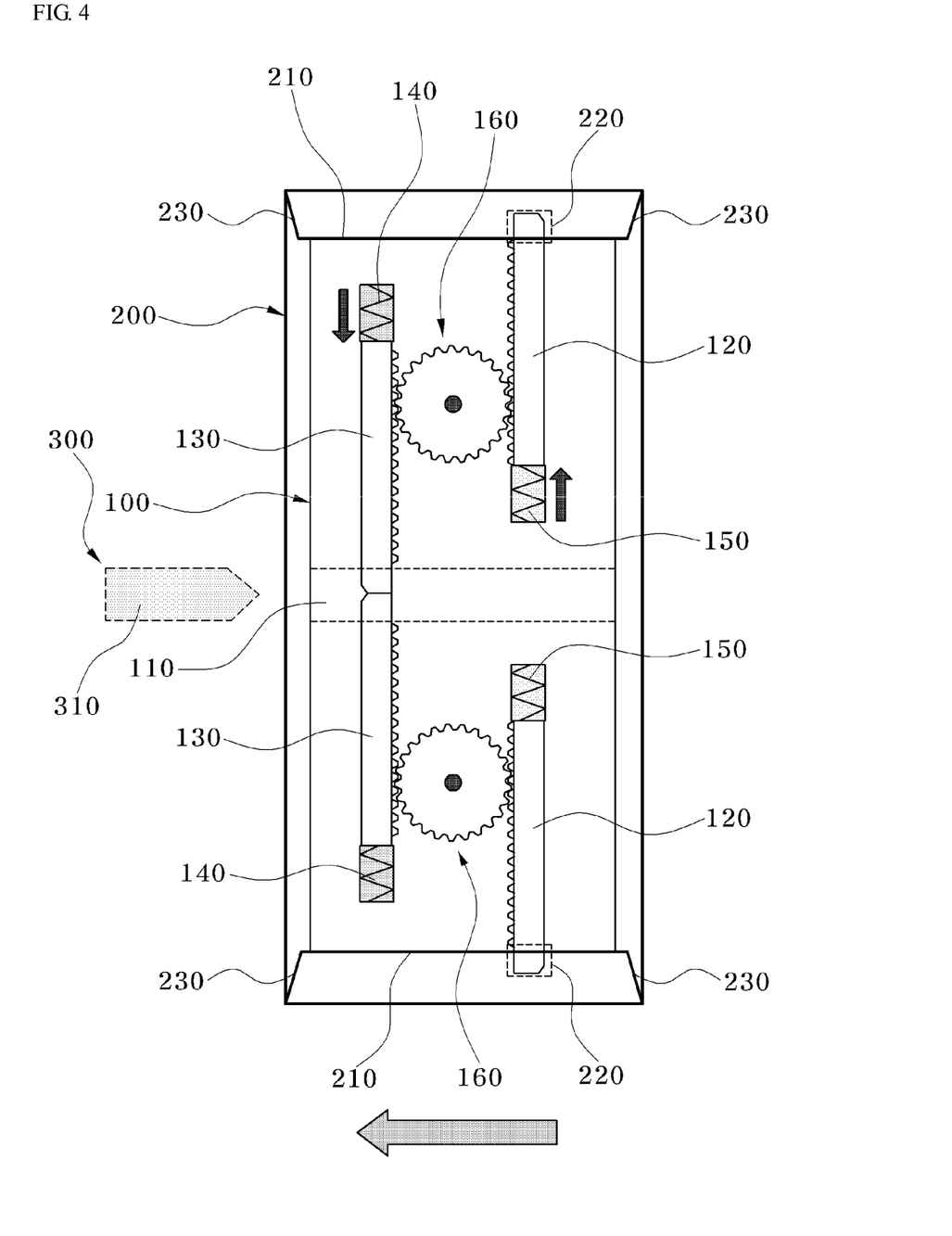
FIG. 4 is a plan view showing a configuration of the main body and the battery mounted on the main body.
Figure 5:
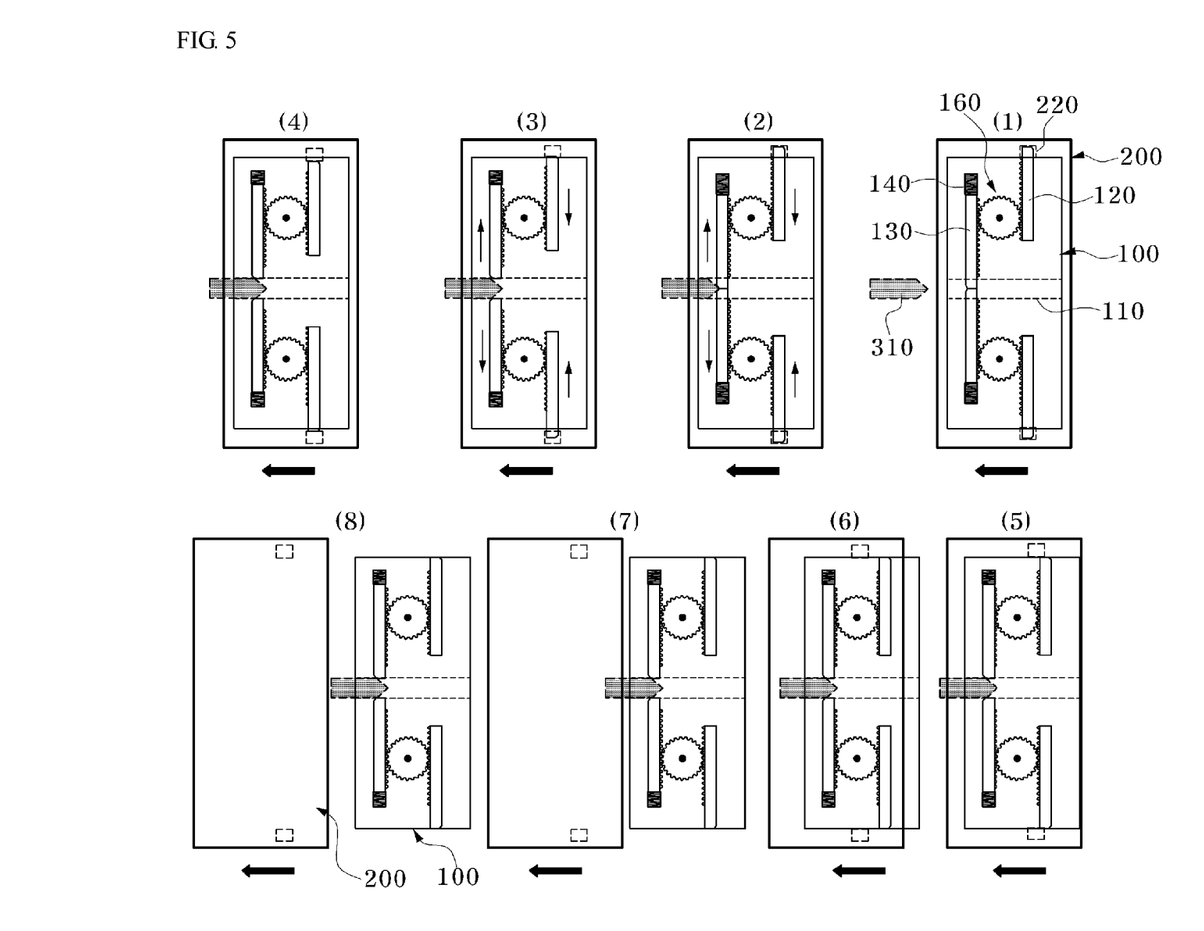
FIG. 5 is an operation view sequentially showing an operation in which the battery is separated.

FIG. 4 is a plan view showing a configuration of the main body and the battery mounted on the main body, and FIG. 5 is an operation view sequentially showing an operation in which the battery is separated.

Hereinafter, a specific configuration and operation in which the battery 100 can be separated from the main body 200 will be described.

As shown in FIGS. 4 and 5, the battery 100 may include an insertion groove 110, a locking protrusion 120, triggers 130, a spring 140, and rack/pinion gears 160.

The insertion groove 110 may be formed at a center region of the battery 100 to allow insertion of the insertion protrusion 310 of the battery mounting unit 400. The insertion groove 110 may be formed to pass through one side of the battery 100 in a progress direction of the main body 200 and the battery 100 by a certain length.

The locking protrusion 120 may be formed in a bar shape having a certain length, and may be installed to enter or exit from the outside to the inside of the battery 100. At least one locking protrusion 120 may be formed at the battery 100. In the embodiment, a pair of locking protrusions 120 are formed to enter or exit one surface and the other surface of the battery 100. Here, the locking protrusions 120 may be disposed to be perpendicular to a progress direction of the main body 200.

The locking protrusion 120 functions to fix the battery 100 to the main body 200 such that the battery 100 is not separated from the main body 200 as the locking protrusion 120 is inserted into a locking groove 220 formed in the main body 200 upon extraction from the battery 100. In addition, when the locking protrusion 120 is inserted into the battery 100, the locking protrusion 120 is separated from the locking groove 220 so that the battery 100 is separable from the main body 200. Here, the spring 140 configured to prevent arbitrary separation of the locking protrusion 120 from the locking groove 220 to fix the battery 100 and the main body 200 may be further installed at one side of the locking protrusion 120.

The triggers 130 may come in contact with the insertion protrusion 310 to be spaced apart from each other to separate the pair of locking protrusions 120 from the pair of locking grooves 220. Here, adjacent center regions of the triggers 130 may be disposed at the insertion groove 110 into which the insertion protrusion 310 is inserted.

The pair of springs 140 may be provided to be mounted on the pair of triggers 130 to bring the trigger 130 in close contact with each other when the insertion protrusion 310 does not come in contact therewith.

The rack/pinion gears 160 may be formed as pairs to be coupled between the triggers 130 and the locking protrusions 120 facing each other to move the triggers 130 and the locking protrusions 120 in different directions. More specifically, the rack gears are installed at one surfaces of the trigger 130 and the locking protrusion 120, and the pinion gears may be meshed with the rack gears formed at the trigger 130 and the locking protrusion 120.

The main body 200 may have a receiving groove 210 formed in the robot 2 and configured to accommodate the battery 100, and the locking groove 220 concaved in the receiving groove 210 so that the locking protrusion 120 is inserted thereinto to fix the battery 100. As a result, the main body 200 can move with an operation of the robot 2 in a state in which the battery 100 is mounted. The locking grooves 220 may be provided as one pair like the locking protrusions 120, and the locking grooves 220 may be disposed to be perpendicular to the progress direction of the main body 200.

Guides 230 inclined and recessed along edges of the receiving groove 210 may be formed at the main body 200 to guide movement of the locking protrusions 120 to the receiving groove 210. For example, the guides 230 may be formed at both corners of an upper side and both corners of a lower side of the main body 200 at which the receiving groove 210 is formed.

The battery separating unit 300 is disposed in a moving direction of the main body 200 on which the battery 100 having the above-mentioned coupling structure is mounted, and functions to separate the battery 100 from the main body 200. The battery separating unit 300 includes the insertion protrusion 310 formed on a moving path of the main body 200 as shown by an arrow and configured to separate the locking protrusion 120 from the locking groove 220. The insertion protrusion 310 may be disposed between the triggers 130, and may have a sharp shape having a wedge shape formed at one side to come in contact with the triggers 130 and space the triggers 130 from each other.

More specifically, as shown in FIG. 5, when the main body 200 on which the battery 100 is moved leftward as shown by an arrow, the insertion protrusion 310 is slowly introduced inside the battery 100 along the insertion groove 110 like operations steps (1) to (4). The pair of triggers 130 are slowly moved away from each other perpendicular to each other in a direction of the arrow. Here, as the triggers 130 are moved, the rack/pinion gears 160 move the locking protrusions 120 in facing directions and the locking protrusions 120 are separated from the locking grooves 220.

Accordingly, the battery 100 is in a state separable from the main body 200, the battery 100 cannot move in a state fixed by the insertion protrusion 310 as the main body 200 slowly moves, and the main body 200 solely moves toward the battery mounting unit 400 like steps (7) and (8) while separating the battery 100 therefrom.

Figure 6:
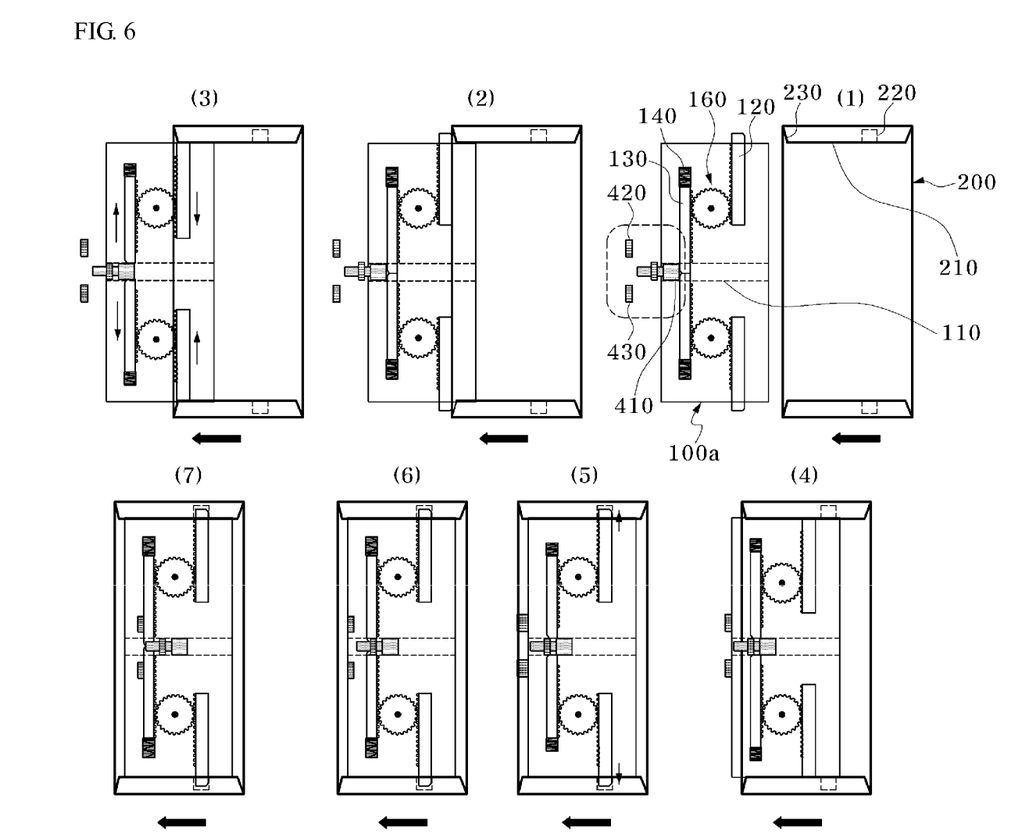
FIG. 6 is an operation view sequentially showing an operation in which the battery is mounted.
Figure 7:
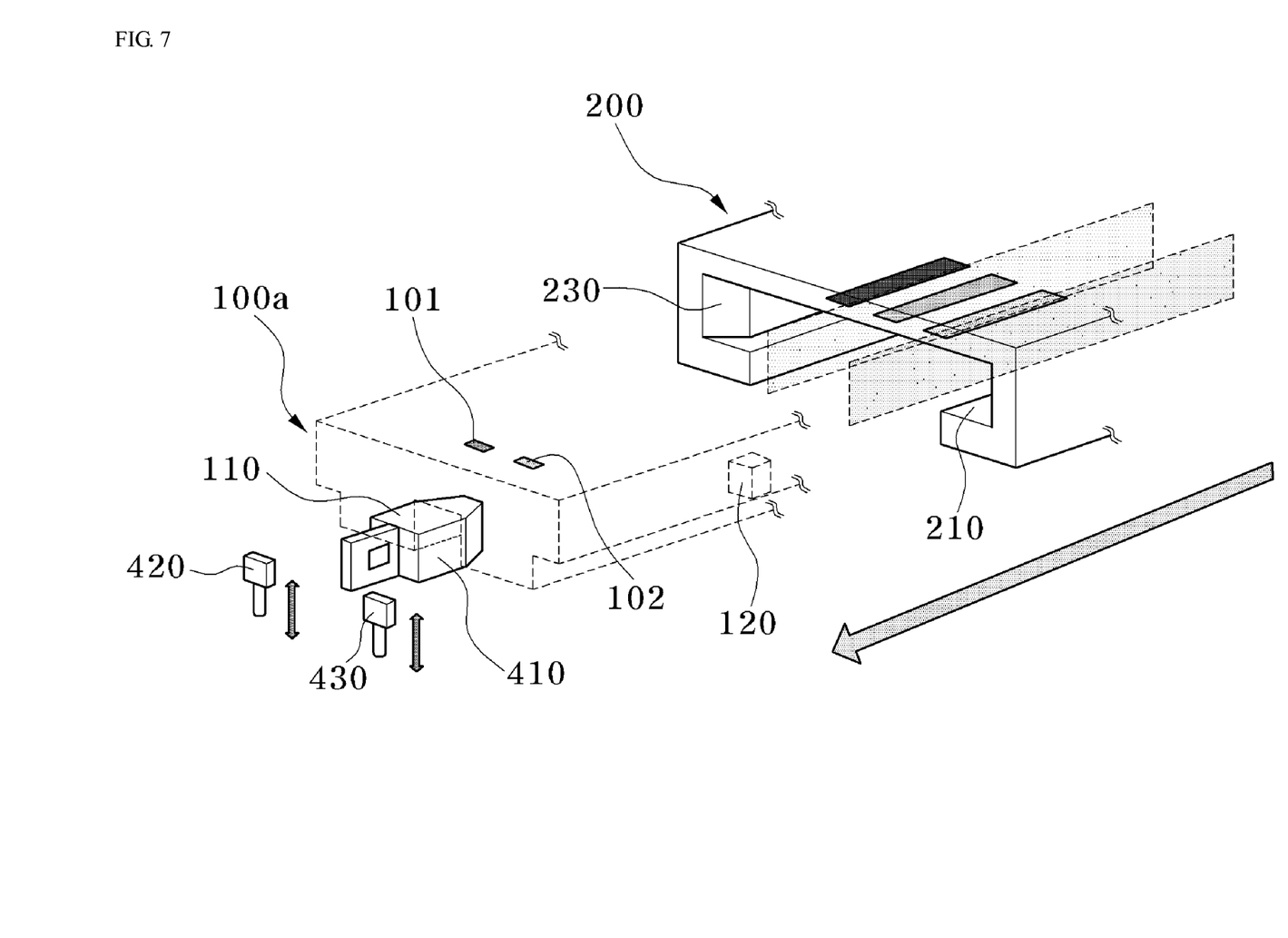
FIG. 7 is a schematic perspective view showing a main body and a battery region in an operation of step (1) of FIG. 6.
Figure 8:
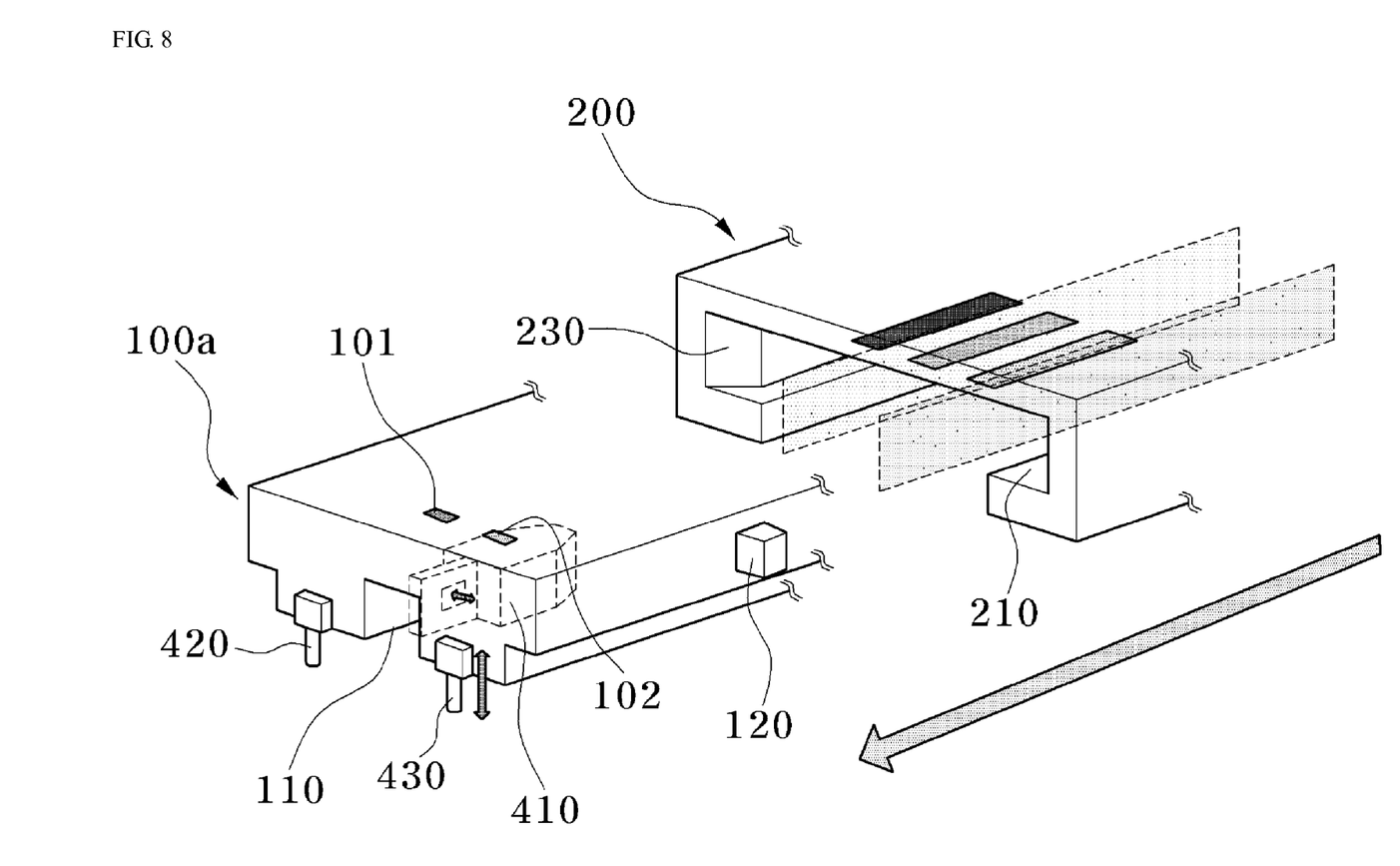
FIG. 8 is a schematic perspective view showing the main body and the battery region in an operation of step (7) of FIG. 6.

FIG. 6 is an operation view sequentially showing an operation in which the battery is mounted, FIG. 7 is a schematic perspective view showing the main body 200 and a battery region in an operation of step (1), and FIG. 8 is a schematic view showing the main body 200 and the battery region in an operation of step (7).

The battery mounting unit 400 functions to mount the charged battery 100a on the main body 200, from which the battery 100 is separated, from the battery separating unit 300 like the above-mentioned process.

More specifically, the battery mounting unit 400 may include a first stopper 410 configured to insert the locking protrusion 120 from the charged battery 100a to mount the charged battery 100a on the main body 200 from which the battery 100 is separated, and second stoppers 420 and 430 configured to raise the charged battery 100a to be brought in close contact with the main body 200 after the locking protrusions 120 are inserted into the locking grooves 220 of the main body 200.

The first stopper 410 may be formed in a sharp shape having a wedge shape formed at one side to be disposed between the triggers 130 to come in contact with the triggers 130 to space the triggers 130 from each other.

As shown in FIG. 6, when the main body 200 from which the battery 100 is separated is moved leftward as shown by the arrow like step (1), the locking protrusion 120 of the battery 100a comes in contact with the guide 230 of the main body 200 like step (2), and the locking protrusion 120 is slowly inserted inside the battery 100a along an inclined surface of the guide 230 like step (3).

Here, in a state in which the locking protrusion 120 is inserted into the main body 200, the battery 100a is slowly moved along the receiving groove 210 of the main body 200 and the first stopper 410 is slowly inserted inside the battery 100a along the insertion groove 110 while spacing the pair of triggers 130 from each other like operations of steps (3) to (6).

As the first stopper 410 passes through the insertion groove 110, the pair of triggers 130 slowly and vertically approaches each other in directions of arrows. As the triggers 130 are moved, the rack/pinion gears 160 move the locking protrusions 120 in a direction spacing the locking protrusions 120 from each other, and the locking protrusions 120 are mounted from the locking groove 220. Here, the second stoppers 420 and 430 are raised to bring the charged battery 100a in close contact with the main body 200 after the locking protrusions 120 are inserted into the locking grooves 220 of the main body 200.

The battery 100a becomes a fixed state from the main body 200 according to the above-mentioned operation, the second stoppers 420 and 430 are lowered again to slowly move the main body 200, and the main body 200 is separated from the non-stop battery exchanging system 1 while mounting the battery 100a.

As can be seen from the foregoing, according to the non-stop battery exchanging system of the embodiment of the present invention, since the used battery can be rapidly and conveniently exchanged with the charged battery and power can be continuously supplied during the exchange in a state in which the apparatus using the battery is in operation without stoppage thereof, an operation time of the system can be maintained and continuity of the operation can be secured.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A non-stop battery exchanging system comprising:
   a battery including a locking protrusion which is movable toward inside or outside the battery, a trigger, and a gear mated with the trigger and the locking protrusion between the trigger and the locking protrusion such that the trigger and the locking protrusion move in different directions;
   a main body having a receiving groove and a locking groove formed in the receiving groove, wherein the locking protrusion is protruded from the battery and inserted into the locking groove to lock the battery when the battery is accommodated in the receiving groove, wherein the main body is configured to move along a predetermined path when exchanging the battery with a charged battery;

a battery separating unit disposed at a first position in the predetermined path to separate the battery attached to the main body from the main body, the battery separating unit including an insertion protrusion mounted at the first position to push the trigger while the main body passes through the first position such that the locking protrusion inserted into the locking groove moves into the battery by the pushed trigger connected with the locking protrusion thereby separating the attached battery from the main body;

a battery mounting unit disposed at a second position in the predetermined path and configured to mount the charged battery on the main body while the main body passes through the second position after passing through the first position, the battery mounting unit including a first stopper mounted at the second position behind the charged battery placed on the predetermined path to be inserted into the receiving groove while the main body approaches the second position, wherein the first stopper pushes a trigger of the charged battery to move a locking protrusion of the charged battery into the locking groove while the main body approaches the second position, wherein the trigger of the charged battery returns to an initial position and the locking protrusion of the charged battery is inserted into the locking groove when the main body passes the second position such that the charged battery is attached to the main body in the receiving groove; and a power supply unit configured to supply power to the main body while the main body moves between the first position and the second position to exchange the battery with the charged battery, the power supply unit including a positive power source rail connected to a positive electrode of the main body between the battery separating unit and the battery mounting unit and a negative power source rail connected to a negative electrode of the battery and a negative electrode of the charged battery.

2. The non-stop battery exchanging system according to claim 1, wherein each of the locking groove and the locking protrusion is provided as a pair, and each of the locking grooves and the locking protrusion is disposed perpendicular to a progress direction of the main body.

3. The non-stop battery exchanging system according to claim 1, wherein the battery further comprises:
a spring mounted on the trigger so that the trigger is able to return to the initial position by an elastic force of the spring.

4. The non-stop battery exchanging system according to claim 1, wherein the main body further comprises a guide surface inclined and recessed along an edge of the receiving groove to guide the locking protrusion of the charged battery into the receiving groove when the main body approaches the second position.

5. The non-stop battery exchanging system according to claim 1, wherein the battery mounting unit further comprises:
a second stopper positioned behind the first stopper, wherein the second stopper rises and pushes up the charged battery toward the main body after the locking protrusion is inserted into the locking groove of the main body.

6. The non-stop battery exchanging system of claim 1, further comprising a dock formed along the predetermined path, wherein the battery separating unit, the battery mounting unit, and the power supply unit are mounted on the dock, and the main body moves on the dock on the predetermined path.

* * * * *